United States Patent [19]

Heisner

[11] 4,228,705

[45] Oct. 21, 1980

[54] TOOL HOLDING DEVICE

[75] Inventor: Marvin M. Heisner, Howell, Mich.

[73] Assignee: Fansteel Inc., North Chicago, Ill.

[21] Appl. No.: 34,445

[22] Filed: Apr. 30, 1979

[51] Int. Cl.³ .................................................. B23B 29/20
[52] U.S. Cl. ................................. 82/36 R; 82/36 A;
    408/198; 408/199; 408/226; 279/1 B
[58] Field of Search ............ 82/36 R, 36 A; 408/226,
    408/231, 232, 233, 238, 239 A, 197, 198, 199;
    279/2, 1 B, 1 ME

[56] References Cited

U.S. PATENT DOCUMENTS

| | | | |
|---|---|---|---|
| 1,465,612 | 8/1923 | Morse | 408/226 |
| 3,433,104 | 3/1969 | Milewski et al. | 408/226 |
| 3,498,653 | 3/1970 | McCreery | 82/36 R |
| 3,815,928 | 6/1974 | Komori | 82/36 R |
| 3,854,840 | 12/1974 | Miyanaga | 408/204 |
| 4,018,112 | 4/1977 | Heaton et al. | 82/36 A |
| 4,125,041 | 11/1978 | French et al. | 82/36 R |
| 4,135,418 | 1/1979 | McCray et al. | 82/36 A |

Primary Examiner—Leonidas Vlachos
Attorney, Agent, or Firm—Barnes, Kisselle, Raisch & Choate

[57] ABSTRACT

A tool holding device for holding a cylindrical barrel in a cylindrical chamber which includes a two-part barrel with the parts axially oriented having facing chamfers to form a V-groove which receives a split ring. The retaining barrel has a rearwardly facing shoulder which form an annular abutment for the periphery of the ring when the ring is expanded by drawing the parts of the barrel axially toward each other.

12 Claims, 11 Drawing Figures

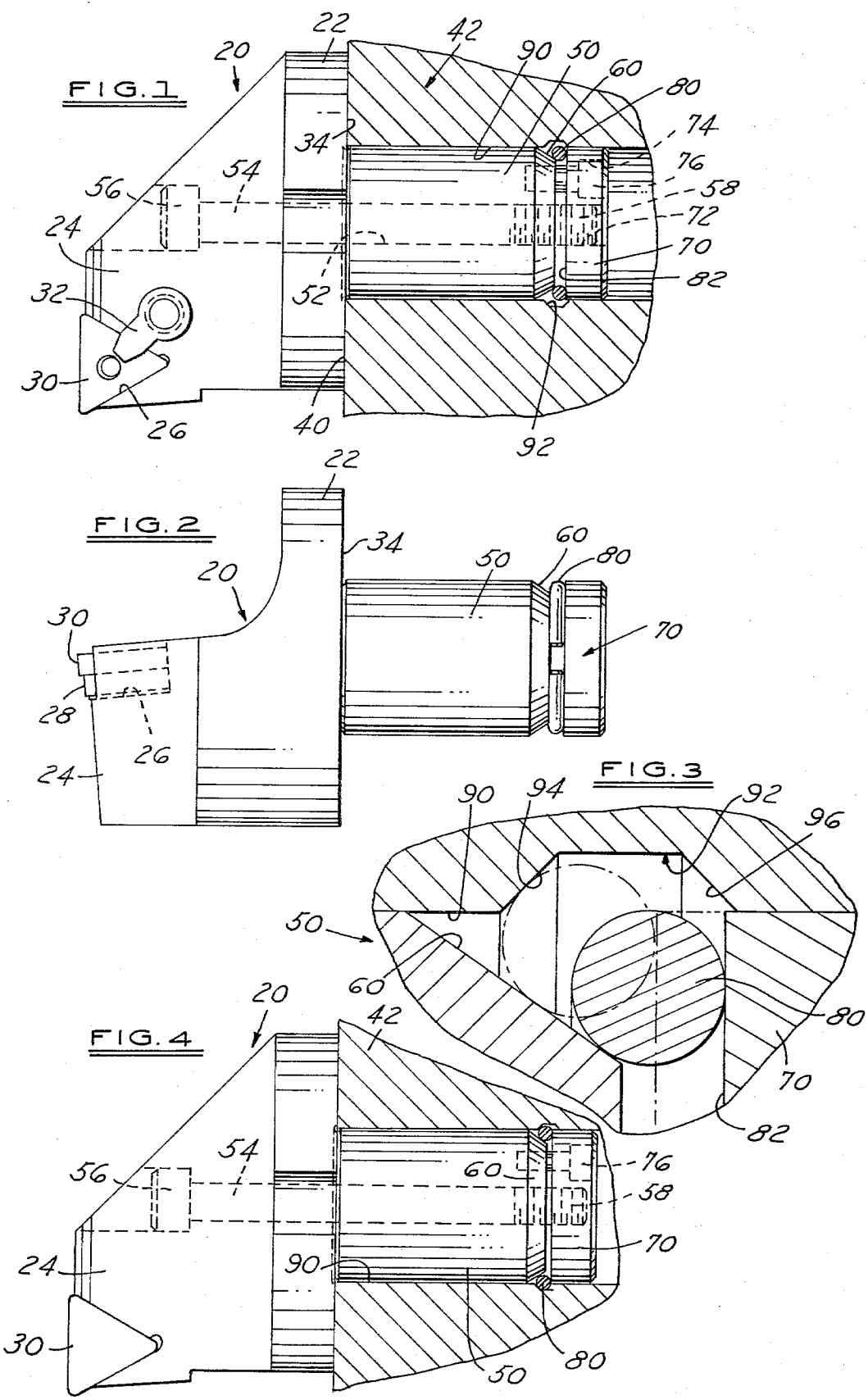

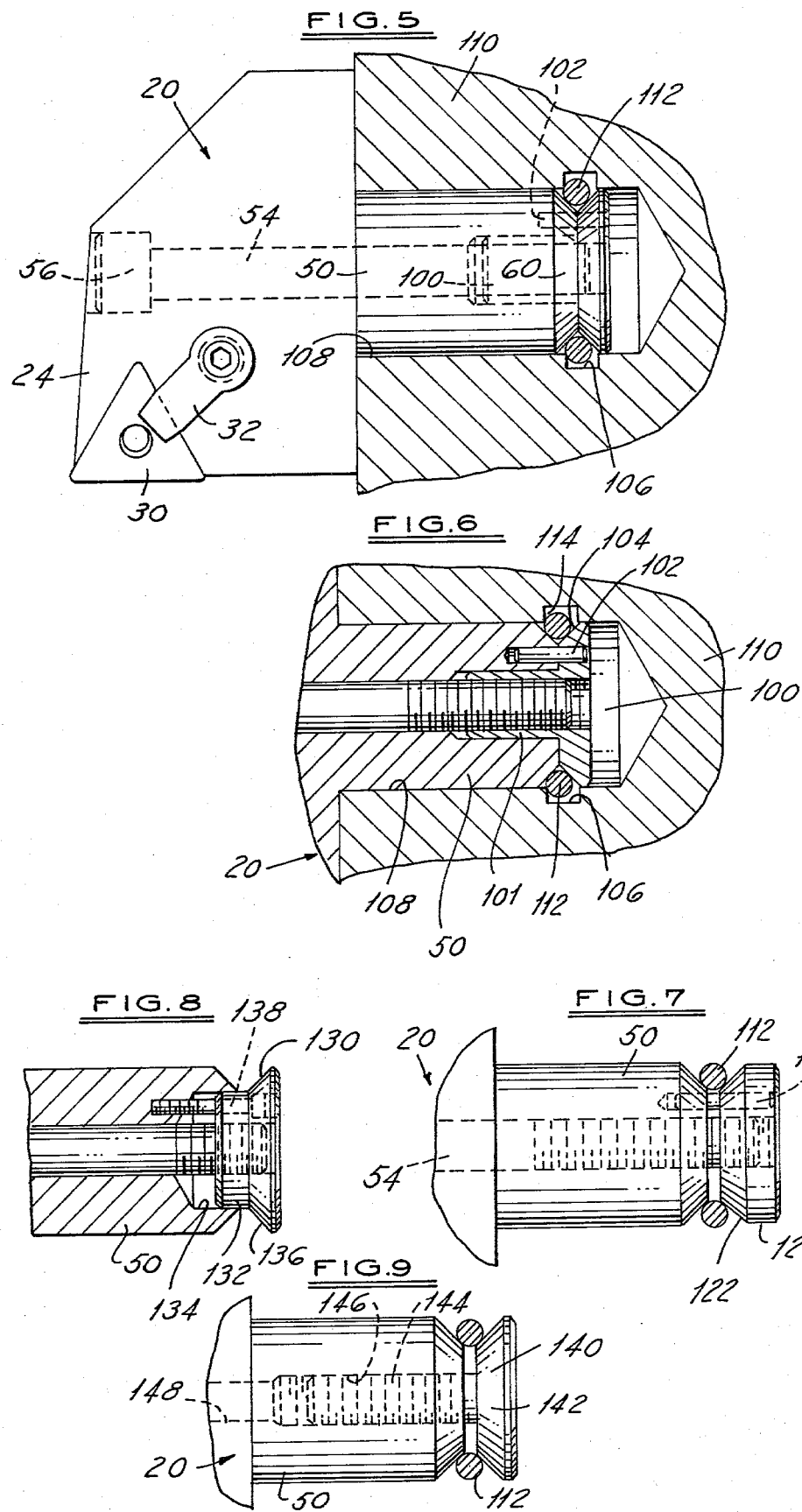

& #x20;# TOOL HOLDING DEVICE

FIELD OF INVENTION

The locating and fastening of cutting tools having a short round shank to be held in a turret of automatic machine or other adaptor blocks positioned to be placed near or moved into proximity to workpieces.

BACKGROUND OF THE INVENTION

Much automatic equipment in use today is adapted for the quick-change tool program. When a tool becomes dull or gets broken for some reason, it is desirable to be able to make a very quick substitution of the tool without long downtime and without elaborate adjustments to size the tool once installed. Drum turrets, vertical size turrets and dual level turrets used in production machines, and other tool blocks, tubes, and adaptors, sometimes mount a large number of tools.

It is desirable to be able to change these tools quickly and to maintain a tool setting within acceptable tolerances in order that the machine may be restarted and production resumed. An example of a connector device directed to this general problem is found in a U.S. patent to McCreery, U.S. Pat. No. 3,498,653, which issued Mar. 3, 1970.

On the other hand, the tool carriers, that is, the cutting insert mounts which locate and clamp the tungsten carbide inserts, are frequently expensive hardened pieces which have a relatively long life. It is desirable to provide a connector for those tool carriers or tool holders which does not require expensive and intricate machining. It is also desirable to provide a connector which maintains the carriers in a fixed and stable position which will be immovable under torquing loads.

It is an object of the present invention to provide a connector for tool carriers which is easily machined and which can be used over long periods of time without expensive maintenance.

It is a further object to provide a connector with a holding surface which is annular in nature and subject to equalized pressures which prevents piercing and marring of the holding surfaces and thus assures accurate and secure fastening in a tool support.

Other objects and features of the invention will be apparent in the following description and claims in which the principles of the invention are set forth together with a detailed disclosure directed to machinists skilled in the art to enable the practice of the disclosed device, all in connection with the best modes presently contemplated for the practice of the invention.

DESCRIPTION OF THE DRAWINGS

Drawings accompany the disclosure and the various views thereof may be briefly described as:

FIG. 1, an assembly view of a connector constructed in accordance with the present invention.

FIG. 2, a view of a tool carrier alone.

FIG. 3, an enlarged partial view of the connector mechanism.

FIG. 4, an assembly view of the connector in locked condition.

FIG. 5, a view of a first modified structure.

FIG. 6, a sectional view of the modified structure.

FIGS. 7, 8 and 9, views, respectively, of second, third and fourth modifications constructed in accordance with the present invention.

In FIGS. 1 and 4, an assembly of a connector constructed in accordance with the present invention is illustrated. A tool carrier 20 has a main circular body 22 with a forward extension 24 having a corner pocket 26 to receive an insert anvil 28 and a cutting insert 30 held in place by a screw clamp 32.

Figure 10:
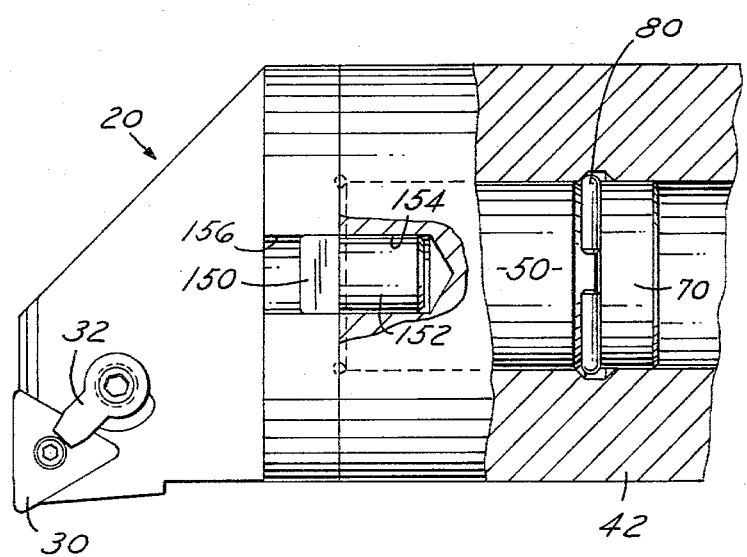
FIG. 10, a view of the utilization of a torque key.

The back surface 34 of the carrier 20 is dimensioned and finished to have an acceptable tolerance dimension with the insert pocket 26. Thus, when the surface 34 is solidly against the supporting surface 40 of a support 42, the insert 30 will have a fixed position in a machine in which it is operating.

Extending rearwardly of an integral with block 20, FIG. 2, is a cylindrical extension 50 having a central bore 52 to receive the shank 54 of a draw bolt 56 exposed to the outer end of the carrier 20. The shank has a threaded end 58. The outer end of the extension 50 has a chamfer 60 of about 35°.

An actuator 70 in the form of a disc has a central threaded bore 72 to receive the threaded end of the draw bolt shank 54. The inner end of disc 70 is formed as a flat surface while the outer end has a 45° chamfer to finish the edge. A stepped axially disposed recess 74 radially outward of the central bore of disc 70 carries a stepped head of a bolt 76 having a threaded end received in a tapped hole in the outer end of extension 50. This bolt allows axial movement of disc 70 while restraining it from rotation. A split ring 80 having a circular cross-section lies in the groove formed between the extension 50 and the face 82 of the disc 70, the inner diameter of the ring resting against the chamfer 60.

Within the support 42 is a cylindrical bore 90 which receives the cylindrical extension 50. An annular groove 92 is cut into the wall of the bore 90 at a predetermined distance from wall 40 and this groove has an angled shoulder 94 (about 45°), FIG. 3, which serves as a pressure surface for the locking assembly. A rear angled shoulder 96 completes the groove 92.

IN THE OPERATION

In FIG. 4, the tool carrier 20 is secured in the cylindrical recess 90 because the bolt 56 has been turned up to draw disc 70 toward the extension 50, thus pulling the split ring 80 up the surface 60 to expand the ring out into the groove 92 where it engages the shoulder 94. This mutual camming force has drawn the carrier surface 34 tight against the support surface 40 and has caused the ring to be tightly in annular contact with surface 60 of extension 50 and surface 94 of groove 92 to provide a resistance to pulling forces on the tool carrier.

When bolt 56 is released, the spring characteristics of the split ring 80 cause it to contract radially and follow the chamfer 60 down into the groove. This permits the tool carrier to be readily withdrawn and serviced. If the ring does not fully contract, the surface 94 will cam it inwardly as the tool is withdrawn.

In FIGS. 5 and 6, a first modification is illustrated. A similar tool carrier 20 has a rearward cylindrical extension 50 with a chamfered end 60. The central bore of the extension 50 is enlarged to provide entry for a tubular pilot 101 on an end cap 100, the pilot being threaded to receive the end of bolt 56. A pin 102 in end cap 100 slides in a suitable recess in extension 50 to restrain the parts from relative rotation. End cap 100 also has a lead chamfer 104, to form with the chamfered end 60 a V-groove inside an annular groove 106 in cylindrical wall 108 of a support 110. A split ring 112 lies in the V-groove and is expandable to move radially outward into groove 106 and contact shoulder 114 to lock the tool carrier in place.

In FIG. 7, a modification somewhat similar to that of FIGS. 5 and 6 is illustrated without the tubular pilot, the shaft 54 of bolt 56 threading directly into an end cap 120 having a chamfered face 122.

FIG. 8 illustrates another modification in which an end cap 130 has a pilot lead 132 which enters a recess 134 in extension 50. A chamfer 136 completes the V-groove while a headed screw 138 serves to prevent rotation.

In FIG. 9, an end cap 140 with a chamfer 142, has a threaded extension 144 which thrusts into a tapped bore 146 in extension 50. The extension 144 can be actuated from outside through bore 148 by placing an Allen wrench socket in the outer end.

Figure 11:
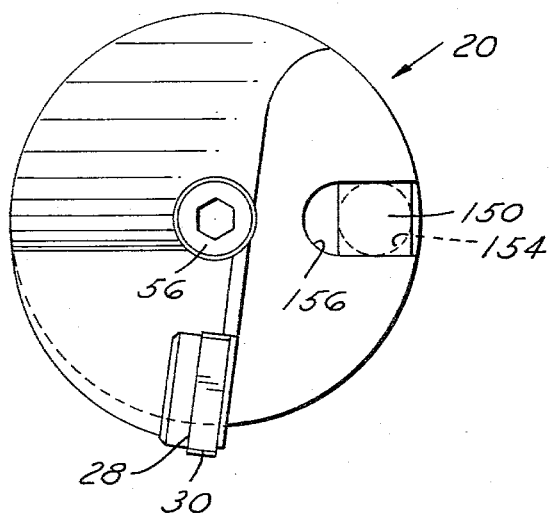
FIG. 11, an end view of the embodiment of FIG. 10.

In FIGS. 10 and 11, an embodiment is shown with a torque key. A torque key having a square head 150 has a round pin extension 152 which seats in a bore 154 in the bar 42. The boring head 20 has a peripheral notch 156 which interfits with the square head 150 of the torque key. This key provides resistance to torque loads.

In each of the embodiments, the operation is the same. The endwise ensmalling of the V-groove forces the split ring up the angled surfaces while expanding it to meet the control shoulder in the support. Thus, a powerful gripping force is attained without any localized pressures such as is exerted by a ball. Expanding the ring from within its diameter insures a uniform expansion and maximum annular contact of the surfaces particularly when the outside of the ring meets the control shoulder in the groove of the support body.

I claim:

1. In a tool holder and support combination wherein the support has a cylindrical recess opening to a first support surface, the recess having means forming a first shoulder facing away from said surface, and said tool holder has a cylindrical extension on an axis extending from a second support surface to lie in face-to-face contact with said first surface, that improvement which comprises a tool holder having:
    (a) an annular second shoulder formed on said extension to serve as a camming surface and spaced from said second surface to lie in proximity to said first shoulder,
    (b) first means movably supported on said cylindrical extension shaped to form an annular groove in conjunction with said second shoulder,
    (c) an expansive ring confined in said groove, and
    (d) second means to move said first means toward said extension to expand said ring radially beyond the cylindrical extension into annular contact with said first shoulder to retain said extension in said recess.

2. A tool holder as defined in claim 1 in which said ring has a circular cross-section.

3. A tool holder as defined in claim 1 in which said shoulder on said extension is chamfered inwardly toward the end of said extension.

4. A tool holder as defined in claim 1 in which said first means comprises an actuator disc positioned on said extension having a shoulder to face toward said second support surface to form a ring retaining groove with said second shoulder, and means to limit rotation of said disc in relation to said extension.

5. A tool holder as defined in claim 1 in which said second means comprises a draw bolt threaded into said first means and accessible for manipulation from one end of said tool holder.

6. A tool holder as defined in claim 4 in which said actuator disc has a cylindrical extension slidable in a central recess in the end of said extension.

7. A tool holder as defined in claim 4 in which said second shoulder and said first means are shaped to provide a V-groove, the opposed walls of which support said expansive ring.

8. A tool holder as defined in claim 6 in which said cylindrical extension comprises a thin walled tube internally threaded and slidable in a central bore in said extension.

9. A tool holder as defined in claim 6 in which the surface of said cylindrical extension junctures with the base of a chamfered surface on said actuator disc to provide a V-groove with said second annular shoulder to support said expansive ring.

10. A tool holder as defined in claim 1 in which said first means comprises an actuator positioned on said extension having a shoulder to face toward said second support surface to form a ring retaining groove with said second shoulder, and a central extension on said actuator threaded into a tapped recess in said extension on said tool holder, said actuator being movable axially by rotation relative to said tool holder.

11. A tool holder as defined in claim 1 in which said support carries an off-center axial extension interfitting with an off-center recess in said tool holder to stabilize said tool holder against forces tending to torque the tool holder in relation to said support.

12. A tool holder as defined in claim 1 in which said first support surface has an off-center bore, a torque pin in said bore having an axial extension projecting from said first support surface, and said tool support has an off-center recess to receive said axial extension to lock said support against torque forces during operation.

* * * * *